(12) United States Patent
Xie et al.

(10) Patent No.: US 11,047,739 B2
(45) Date of Patent: Jun. 29, 2021

(54) MEASUREMENT DEVICE AND MEASUREMENT METHOD FOR MEASURING TEMPERATURE AND EMISSIVITY OF A MEASURED SURFACE

(71) Applicant: Shenyang Taihe Metallurgical Measurement And Control Technologies Co., Ltd., Shenyang (CN)

(72) Inventors: Zhi Xie, Shenyang (CN); Xunjian Che, Shenyang (CN); Qixian Xie, Shenyang (CN); Lizhong Wang, Shenyang (CN)

(73) Assignee: Shenyang Taihe Metallurgical Measurement and Control Technologies Co., Ltd., Shenyang (CN)

( * ) Notice: Subject to any disclaimer, the term of this patent is extended or adjusted under 35 U.S.C. 154(b) by 16 days.

(21) Appl. No.: 16/461,212

(22) PCT Filed: Dec. 26, 2016

(86) PCT No.: PCT/CN2016/112100
§ 371 (c)(1),
(2) Date: May 15, 2019

(87) PCT Pub. No.: WO2018/119573
PCT Pub. Date: Jul. 5, 2018

(65) Prior Publication Data
US 2019/0277701 A1    Sep. 12, 2019

(51) Int. Cl.
*G01J 5/08* (2006.01)
*G01J 5/00* (2006.01)
(Continued)

(52) U.S. Cl.
CPC ............... *G01J 5/0815* (2013.01); *G01J 5/00* (2013.01); *G01J 5/0022* (2013.01);
(Continued)

(58) Field of Classification Search
CPC .......... G01J 5/0815; G01J 5/00; G01J 5/0022; G01J 5/0809; G01J 5/522; G01J 5/0818;
(Continued)

(56) References Cited

U.S. PATENT DOCUMENTS

| 4,657,397 A | * | 4/1987 | Oehler | ...................... G01J 1/04 |
| | | | | 250/343 |
| 5,326,173 A | * | 7/1994 | Evans | ................... G01J 5/0022 |
| | | | | 250/341.7 |

(Continued)

FOREIGN PATENT DOCUMENTS

| CN | 201811795 U | 4/2011 |
| CN | 102252755 A | 11/2011 |

(Continued)

OTHER PUBLICATIONS

Tychowsky et al., Development and application of a gold cup sensor for measurement of strip temperatures on a continuous galvanizing line, Iron and Steel Engineer, Sep. 1998, pp. 37-42, vol. 75, No. 9, Association of Iron and Steel Engineers, Pittsburg, PA, US.

(Continued)

*Primary Examiner* — Mark R Gaworecki
(74) *Attorney, Agent, or Firm* — Sterne, Kessler, Goldstein & Fox P.L.L.C.

(57) ABSTRACT measurement device and a measurement method for measuring a temperature and an emissivity of a measured surface are provided. The measurement device includes a reflection converter, an optical receiver and a data processor. The reflection converter includes a reflector having a through hole and an absorber tube shifted between a first measurement position and a second measurement position relative to the reflector. In the first measurement position, the light incident end of the absorber tube approaches or contacts the measured surface, such that the optical receiver forms a first electrical signal. In the second measurement (Continued)

position, the light incident end of the absorber tube is located at or outside the through hole, such that the optical receiver forms a second electrical signal. The data processor is configured to determine a temperature and an emissivity of the measured surface according to the first electrical signal and the second electrical signal.

19 Claims, 3 Drawing Sheets

(51) Int. Cl.
  *G01J 5/52* (2006.01)
  *G01N 21/55* (2014.01)
(52) U.S. Cl.
  CPC .............. *G01J 5/0809* (2013.01); *G01J 5/522* (2013.01); *G01N 21/55* (2013.01)
(58) Field of Classification Search
  CPC .......... G01J 5/084; G01J 5/085; G01J 5/0887; G01J 5/60; G01J 2005/0074; G01N 21/55
  USPC ......................................................... 250/253
  See application file for complete search history.

(56) References Cited

U.S. PATENT DOCUMENTS

| | | | | |
|---|---|---|---|---|
| 6,007,241 A * | 12/1999 | Yam | ........................ | G01J 5/041 219/405 |
| 6,371,925 B1 * | 4/2002 | Imai | .......................... | G01J 5/02 374/E13.003 |
| 6,375,350 B1 * | 4/2002 | Stein | ........................ | F24C 7/083 250/353 |
| 8,581,159 B2 * | 11/2013 | Ernst | ...................... | H05B 6/062 219/622 |
| 9,028,135 B1 * | 5/2015 | Quince | ................... | G01J 5/041 374/1 |

FOREIGN PATENT DOCUMENTS

| | | | |
|---|---|---|---|
| CN | 102353691 A | 2/2012 | |
| CN | 104439122 A | 3/2015 | |
| EP | 0685720 A1 * | 12/1995 | ............. G01J 5/602 |
| EP | 0685720 A1 | 12/1995 | |
| EP | 0942269 A1 | 9/1999 | |
| EP | 1103801 A1 * | 5/2001 | ............ G01J 5/0821 |
| EP | 1180669 A1 * | 2/2002 | ............ G01J 5/0875 |
| EP | 1180669 A1 | 2/2002 | |
| EP | 1103801 B1 | 6/2006 | |
| JP | 07174634 A | 7/1995 | |
| JP | 10185691 A | 7/1998 | |

OTHER PUBLICATIONS

Supplementary European Search Report in Application No. EP 16925986.8, dated Mar. 11, 2020.
H.B. Becker et al., "Effect of specular reflection of hemispherical surface pyrometer on emissivity measurement," J. Phys. E: Sci. Instrum., vol. 14, 1981.
R.E. Bedford et al., "Calculation of the radiant characteristics of a plane diffuse surface covered by a specular hemisphere," J. Phys. E: Sci. Instrum. 21 (1988) 785-791.
J.C. Krapez et al., "Reflecting-cavity IR temperature sensors: an analysis of spherical, conical and double-wedge geometries," National Research Council Canada, Industrial Materials Research Institute.
C. Ciaurriz et al., "Thermoregulated fiber-optic probe validation for temperature determination in spite of radiation disturbances," Review of Scientific Instruments 63, 3623 (1992).
Paolo Cielo et al., "Conical-cavity fiber optic sensor for temperature measurement in a steel furnace," Optical Engineering, Mar. 1993, vol. 32 No. 3.
International Search Report issued in PCT/CN2016/112100, dated Oct. 11, 2017, 5 pages (including translation).
MD Drury, KP Perry, and T. Land, "Pyrometers for surface temperature measurement," J. Iron St. Inst , vol. 169, pp. 245-250, 1951 (explanation of reference cited in Specification).
Xie Zhi et al., temperature measurement of industrial radiation, Northeastern University Press, 1994 (cited in Specification).
Gao Kuiming et al., "Study on the Radiation Pyrometer Preceded with a Reflector," Journal of Northeast Institute of Technology, 1984, Figure 5.
P.R.C. Guard, "Application of hemispherical surface pyrometers to the measurement of the emissivity of platinum (a low-emissivity material)", J. Sci. Instrum., 1996, vol. 43.

* cited by examiner

MEASUREMENT DEVICE AND MEASUREMENT METHOD FOR MEASURING TEMPERATURE AND EMISSIVITY OF A MEASURED SURFACE

FIELD

The present application relates to the technical field of measurement, and in particular relates to measurement device and measurement method for measuring temperature and emissivity of a measured surface.

BACKGROUND

When a radiation thermometer is utilized to measure a surface temperature, measurement accuracy of the surface temperature has always been an unsolved problem in the field of metrological test under influence of emissivity. Various types of radiation thermometers widely used in the prior art are calibrated under the condition of a standard metrological instrument of laboratory—blackbody radiation source (its emissivity≈1). During the measurement, the measured temperature T may be obtained according to a radiation signal and a calibration equation. However, emissivity of an actual object is less than 1, and during the measurement, there is obtained only a brightness temperature rather than an actual surface temperature. The emissivity of an actual object which is complex and indeterminate, is related to the composition of the object, the surface condition, the wavelength and the temperature. Thus, an actual surface temperature can be obtained only when a value of emissivity is known.

To reduce or eliminate the effect of emissivity, a temperature measurement method using on-line blackbody based on a reflector is proposed (MD Drury, K P Pery, and T. Land, "Pyrometers for surface temperature measurement," J. Iron St. Inst, vol. 169, pp. 245-250, 1951.): a cavity is formed by covering a cold, high-reflectivity reflector on a high temperature surface, with multiple reflections between a measured surface and the reflector, and the effective radiation of the measured surface increases to approach a radiation state of the blackbody, i.e. an effective emissivity is close to 1. In 1994, Xie Zhi et al. put forward the concept of 'second category of blackbody radiation source' (Xie Zhi et al., temperature measurement of industrial radiation, Northeastern University Press, 1994): "if a hermetic cavity is constituted by an isothermal surface formed by a non-transparent material and an ideal reflector, the radiation emitted from any surface source of the isothermal surface is a blackbody radiation at the isothermal surface source's temperature." According to this principle, a reflector can be provided in front of a radiation thermometer, so that the effective emissivity may be increased, thereby reducing a measurement error.

The patent with the announcement No. EP1103801B1 and the patent application with the publication No. EP0942269A1 disclose a temperature measurement method and measurement device based on the above principle: a gold-plated hyperbolic concave mirror is used as an emissivity enhancer and the effective radiation is increased by utilizing a multi-reflection effect, thereby reducing a measurement error. However, there is virtually no ideal reflector, a reflector has a reflectance of less than 1, and an optical radiation aperture in the reflector and a gap to the measured surface lead to a non-hermetic cavity, so that effective emissivity cannot reach 1. Thus, the invention can reduce but not eliminate the effect of emissivity and still requires a user to enter an empirical value of effective emissivity. The empirical value is set at 0.95 in EP1103801B1. If it is to thoroughly eliminate the effect of emissivity, and accurately measure the surface temperature, it is necessary to accurately solve an expression of an effective emissivity, whereas the aforementioned two inventions cannot measure the emissivity but only measure the surface temperature.

The Chinese patent application with the publication No. CN102353691A and the patent for invention application with the publication No. CN102252755A respectively disclose an on-line measurement device and method of multi-spectral emissivity based on a hemispherical and cylindrical anterior reflector. The reflector in the inventions may move on a guide rail and may be shifted in the two states of receiving radiation: 1) the reflector is moved into a detection field, and the light beam passing through a light radiation hole is detected to obtain a radiation signal $V_{\lambda_i,1}$; 2) then the reflector is moved out of the detection field to obtain an inherent radiation signal $V_{\lambda_i,2}$ without the effect of the reflector, and obtain an emissivity $\varepsilon(\lambda, T)$ according to the formula $V_{\lambda_i,1}/V_{\lambda_i,2}=f(\varepsilon(\lambda, T))/\varepsilon(\lambda, T)$, wherein $f(\varepsilon(\lambda, T))$ is an effective emissivity function of a reflector.

In the process of realizing the present invention, the inventor finds that the Chinese patent application with the publication No. CN102353691A and the patent for invention with the publication number CN102252755A still have the following deficiencies:

First, from the aspect of accuracy: 1) the reflector in the aforementioned two patent documents is required be installed on a guide rail so as to realize movement on a measured surface, and there is necessarily a gap to the measured surface so that the radiation light emitted from the measured surface may escape from the gap, so as to affect the measurement accuracy. At the same time, it can be known by theoretical calculation that, the hemispherical reflector is particularly sensitive to the distance to the measured surface, if the spherical center deviates from the measured surface, it may cause a sharp decline in the effective emissivity, so that the bottom gap remarkably affect the measurement accuracy. 2) The reflector has a damaging effect on the temperature field of the measured surface, so the reflector cannot perform long-time measurement (Gao Kuiming et al., Research on a temperature thermometer with an anterior reflector, 1984, FIG. 5). If the reflector measures stainless steel of 700° C., the measured surface temperature rises about 4° C. when the reflector covers for 1 second and rises about 6° C. for 2 seconds. Thus, rapid measurement is required. Moreover, in the aforementioned patent documents it is at least necessary to move at a distance equal to twice the radius of the reflector in order to shift the reflector between two states of receiving radiation. In shifting process, a temperature field is inevitably damaged, thereby affecting the measurement accuracy. 3) When the reflector is moved away in the aforementioned two patent documents, the measured surface is exposed in the space and the surrounding background radiation may be reflected by the measured surface to the optical aiming probe. Thus, the measurement signal which may be subject to an interference by the background radiation, can only be applied in an ideal laboratory surrounded with cold walls, but cannot be applied in industrial fields. 4) The aforementioned two patents only measure the normal emissivity, but cannot measure the directional emissivity.

Second, from the aspect of application, before measuring using the measurement devices disclosed in the aforementioned two patent documents, a guide rail and a support frame have to be installed, and the guide rail have to be adjusted to be horizontal to the measured surface. When the reflectors have the same dimension, a space at least covering the reflector is needed for its movement. With much space and high requirement needed for installation, a high cost and a poor portability, and a significant influence by the background radiation, it is not suitable for industrial fields with strong background radiation, such as an occasion with limited space, or an occasion requiring rapid and convenient measurement, or an occasion in which a guide rail and a support frame cannot be installed, for example a steel blank surface and a continuously cast blank surface within a heating furnace of a steel plant with a significant background radiation.

BRIEF SUMMARY

The object of the present application is to provide a measurement device and a measurement method capable of more accurately measuring a temperature and an emissivity of a measured surface.

A first aspect of the present application provides a measurement device for measuring a temperature and an emissivity of a measured surface, which comprises a reflection converter, an optical receiver and a data processor; wherein the optical receiver is coupled to the reflection converter and is configured to receive radiation light emitted from a measured surface and passing through the reflection converter and convert the radiation light into an electrical signal, the data processor is coupled to the optical receiver and is configured to receive the electrical signal and determine a temperature and an emissivity of the measured surface according to the electrical signal. The reflection converter comprises a reflector having a through hole, and an absorber tube which is movably arranged with respect to the reflector in order to shift the absorber tube between a first measurement position and a second measurement position; wherein in the first measurement position, a light incident end of the absorber tube is positioned in the reflector by inserting the absorber tube into the through hole, and the light incident end of the absorber tube approaches or contacts the measured surface, such that the optical receiver receives inherent radiation light emitted from the measured surface and forms a first electrical signal; in the second measurement position, the light incident end of the absorber tube is positioned at the through hole or outside the through hole, such that the optical receiver receives the inherent radiation light emitted from the measured surface and reflective radiation light between a reflection surface of the reflector and the measured surface and forms a second electrical signal. The data processor is configured to determine a temperature and an emissivity of the measured surface according to the first electrical signal and the second electrical signal.

A second aspect of the present application provides a measurement method for measuring a temperature and an emissivity of a measured surface, wherein the measurement method comprises measuring the temperature and the emissivity using the measurement device according to the first aspect of the present application.

Preferably, the first electrical signal is a first voltage signal, and the second electrical signal is a second voltage signal, the measurement method comprising:

a step of obtaining n expressions of radiation brightness at the first measurement position: positioning the absorber tube at the first measurement position, and obtaining n expressions of radiation brightness at the first measurement position under n wavelengths or under n wavebands according to the following formula: $L_1(\lambda_i, T_0)=\varepsilon(\lambda_i)L_0(\lambda_i, T_0)$, wherein $L_1(\lambda_i, T_0)$ is radiation brightness of radiation light emitted from the measured surface under a wavelength $\lambda_i$ and received by the optical receiver, and is a function of the first voltage signal and a spectrum response function of the optical receiver; $\varepsilon(\lambda_i)$ is emissivity of the measured surface under a wavelength $\lambda_i$; $L_0(\lambda_i, T_0)$ is radiation brightness of a blackbody under the same condition with the measured surface: i=1~n, where i, n is a positive integer greater than or equal to 1; $\lambda_i$ is an effective wavelength, with a unit of meter; $T_0$ is a temperature of the measured surface, with a unit of K;

a step of obtaining n expressions of radiation brightness at the second measurement position: positioning the absorber tube at a second measurement position, and obtaining n expressions of radiation brightness at the second measurement position under n wavelengths or under n wavebands according to the following formula: $L_2(\lambda_i, T_0)=f(\varepsilon_i)L_0(\lambda_i, T_0)$, wherein $L_2(\lambda_i, T_0)$ is radiation brightness of radiation light emitted from the measured surface under a wavelength $\lambda_i$ and received by the optical receiver, and is a function of the second voltage signal and a spectrum response function of the optical receiver; $f(\varepsilon_i)$ is a function of effective emissivity of the reflector under a wavelength $\lambda_i$;

a step of obtaining a measurement result: simultaneously calculating the temperature $T_0$ and n emissivities $\varepsilon_i$ according to n expressions of radiation brightness at the first measurement position $L_1(\lambda_i, T_0)=\varepsilon(\lambda_i)L_0(\lambda_i, T_0)$ and n expressions of radiation brightness at the second measurement position $L_2(\lambda_i, T_0)=f(\varepsilon_i)L_0(\lambda_i, T_0)$.

Based on the measurement device and the measurement method of a temperature and an emissivity of a measured surface provided by the present application, since the absorber tube may be shifted between a first measurement position and a second measurement position, the measurement device may enable the optical receiver to obtain the inherent radiation light of the detected surface and to obtain the aforementioned inherent radiation light plus the reflective radiation light between the reflector and the measured surface only by movement of the absorber tube. The data processor may obtain the temperature and the emissivity of the measured surface at the same time according to the obtained data when the absorber tube is positioned at different measurement positions.

Based on the theory of the second category of blackbody radiation source, the present application proposes a reflection converter with a reflector and an absorber tube with a variable position relative to the reflector, so as to realize rapid conversion of two states of receiving radiation (receiving inherent radiation and receiving inherent radiation and reflective radiation). In addition to effectuating measuring a temperature and an emissivity of a measured surface at the same time, its advantages further lie in that:

First, the measurement accuracy is improved, and the reasons lie in that: 1) in order to obtain two states of receiving radiation, there is no need to move the reflector, and the gap between the reflector and the measured surface may be smaller or there is even no gap (the reflector may be in contact with the measured surface), so that the radiation light emitted from the measured surface and escaping via a gap at the bottom is reduced or eliminated, and the measurement accuracy is raised; 2) it is only necessary to move the absorber tube so as to effectuate shifting between two states of receiving radiation, and compared to movement of a reflector, the absorber tube has a smaller volume and a lighter mass and moves at a shorter distance (for example, if it is a hemispherical reflector, it is necessary to move a distance equal to radius of the reflector), so as to realize a faster shifting speed, a less damage of a surface temperature field, and a more accurate measurement; 3) it is not necessary to move the reflector, so as to help eliminate an interference by the background radiation, and also improve the measurement accuracy: 4) it may not only measure a normal emissivity, and may design the position of the absorber tube relative to the reflector, so as to measure a non-normal emissivity.

Second, from the aspect of application, since there is no need for auxiliary structures such as a guide rail and a support frame, and there is no need to move the reflector, it has the advantages of smaller space and less requirements needed for measurement, a lower cost, a favorable portability without an interference by the background radiation: and it is adapted to an occasion with limited space, or an occasion requiring rapid measurement, or an occasion in which a guide rail and a support frame cannot be installed, for example a steel blank surface and a continuously cast blank surface within a heating furnace of a steel plant with a significant background radiation.

Other features of the present application and advantages thereof will become explicit by means of the following detailed descriptions of exemplary embodiments of the present application with reference to the drawings.

BRIEF DESCRIPTION OF THE DRAWINGS

The drawings described herein are used to provide a further understanding of the present application and constitute a part of the present application. The illustrative embodiments of the present application as well as the descriptions thereof, which are used for explaining the present application, do not constitute improper definitions on the present application. In the drawings:

In FIG. 1 to FIG. 6, various reference signs respectively represent:

Figure 1:
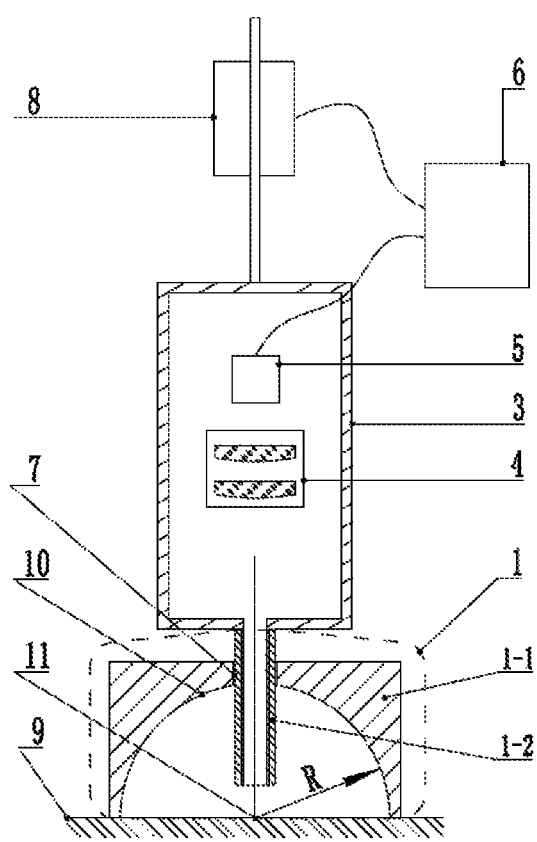
FIG. 1 is a schematic view of the structure of the measurement device according to the first embodiment of the present application.

1. reflection converter; 1-1. reflector; 1-2. absorber tube; 2. spectrometer; 3. driving device; 4. light guide structure; 5. optical receiver; 6. data processor; 7. through hole; 9. measured surface; 10. reflection surface; 11. spherical center; 13. second measurement position; 14. first measurement position.

DETAILED DESCRIPTION

Next, the technical solution in the embodiments of the present application will be explicitly and completely described in combination with the drawings in the embodiments of the present application. Apparently, the described embodiments are merely part of the embodiments of the present application, rather than all the embodiments. The following descriptions of at least one exemplary embodiment which are in fact merely descriptive, by no means serve as any delimitation on the present application as well as its application or use. On the basis of the embodiments of the present application, all the other embodiments acquired by a person skilled in the art on the premise that no inventive effort is involved fall into the protection scope of the present application.

Unless additionally specified, the relative arrangements, numerical expressions and numerical values of the components and steps expounded in these examples do not limit the scope of the present application. At the same time, it should be understood that, in order to facilitate the description, the dimensions of various parts shown in the drawings are not delineated according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

In order to facilitate the description, spatial relative terms such as "on . . . ", "above . . . ", "at an upper surface of . . . " and "upper" may be used here, for describing spatial position relations of one device or feature with other devices or features as shown in the drawings. It should be understood that the spatial relative terms are intended to contain different orientations in use or operation other than the orientations of the devices described in the figures. For example, if the device in the drawings is inverted, it is described in a way such that a device that is "above a further device or configuration" or "on a further device or configuration" will be afterwards positioned to be "below a further device or configuration" or "inferior to a further device or configuration". Thus, the exemplary term "above . . . " may include such two orientations as "above . . . " and "below . . . ". The device may also be positioned and rotated 90° in other ways or situated in other orientations, and the spatial relative descriptions used here are explained accordingly.

The embodiments of the present application provide a measurement device for measuring a temperature and an emissivity of measured surface, which is capable of more accurately measuring.

As shown in FIGS. 1 to 6, the measurement device of the present application comprises a reflection converter 1, an optical receiver 5 and a data processor 6. The optical receiver 5 is coupled to the reflection converter 1, and is configured to receive radiation light emitted from a measured surface 9 and passing through the reflection converter 1, and convert the radiation light into an electrical signal. The data processor 6 is coupled to the optical receiver 5 and is configured to receive the electrical signal and determine a temperature and an emissivity of the measured surface 9 according to the electrical signal. The reflection converter 1 comprises a reflector having a through hole 7, and an absorber tube 1-2 which is movably arranged with respect to the reflector 1-1 in order to shift the absorber tube 1-2 between a first measurement position and a second measurement position. Wherein, in the first measurement position, a light incident end of the absorber tube 1-2 is positioned in the reflector 1-1 by inserting the absorber tube 1-2 into the through hole, and the light incident end of the absorber tube 1-2 approaches or contacts the measured surface 9, such that the optical receiver 5 receives inherent radiation light emitted from the measured surface 9 and forms a first electrical signal; in the second measurement position, the light incident end of the absorber tube 1-2 is positioned at the through hole 7 or outside the through hole 7, such that the optical receiver 5 receives the inherent radiation light emitted from the measured surface 9 and reflective radiation light between a reflection surface 10 of the reflector 1-1 and the measured surface 9 and forms a second electrical signal. The data processor 6 is configured to determine a temperature and an emissivity of the measured surface 9 according to the first electrical signal and the second electrical signal.

Since the absorber tube 1-2 may be shifted between a first measurement position and a second measurement position, the above measurement device may enable the optical receiver 5 to obtain the inherent radiation light of the detected surface 9 and to obtain the aforementioned inherent radiation light plus the reflective radiation light between a reflection surface 10 of the reflector 1-1 and the measured surface 9 only by movement of the absorber tube 1-2. The data processor 6 may obtain the temperature and the emissivity of the measured surface 9 at the same time according to the obtained data when the absorber tube is positioned at different measurement positions.

Based on the theory of the second category of blackbody radiation source, the present application proposes a reflection converter with a reflector and an absorber tube with a variable position relative to the reflector, so as to realize rapid conversion of two states of receiving radiation (receiving inherent radiation and receiving inherent radiation and reflective radiation). In addition to effectuating measuring a temperature and an emissivity of a measured surface at the same time, its advantages further lie in that:

First, from the aspect of measurement accuracy: 1) in order to obtain two states of receiving radiation, there is no need to move the reflector, and the gap between the reflector and the measured surface may be smaller or there is even no gap (the reflector may be in contact with the measured surface), so that the radiation light emitted from the measured surface and escaping via a gap at the bottom is reduced or eliminated, and the measurement accuracy is raised; 2) it is only necessary to move the absorber tube so as to effectuate shifting between two states of receiving radiation, and compared to movement of a reflector, the absorber tube has a smaller volume and a lighter mass and moves at a shorter distance (for example, if it is a hemispherical reflector, it is necessary to move a distance equal to radius of the reflector), so as to realize a faster shifting speed, a less damage of a surface temperature field, and a more accurate measurement; 3) it is not necessary to move the reflector, so as to help eliminate an interference by the background radiation, and also improve the measurement accuracy; 4) it may not only measure a normal emissivity, and may design the position of the absorber tube relative to the reflector, so as to measure a non-normal emissivity.

Second, from the aspect of application, since there is no need for auxiliary structures such as a guide rail and a support frame, and there is no need to move the reflector, it has the advantages of smaller space and less requirements needed for measurement, a lower cost, a favorable portability without an interference by the background radiation: and it is adapted to an occasion with limited space, or an occasion requiring rapid measurement, or an occasion in which a guide rail and a support frame cannot be installed, for example a steel blank surface and a continuously cast blank surface within a heating furnace of a steel plant with a significant background radiation.

It can be seen that the measurement device has the advantages of simple structure, fast measurement speed, portability and easier operation and arrangement, as it is only necessary to move the absorber tube to obtain different states of receiving radiation.

Preferably, the first electrical signal is a first voltage signal, the second electrical signal is a second voltage signal, and the data processor 6 is configured to process the first voltage signal and the second voltage signal by:

obtaining n expressions of radiation brightness at the first measurement position under n wavelengths or under n wavebands according to the following formula: $L_1(\lambda_i, T_0) = \varepsilon(\lambda_i) L_0(\lambda_i, T_0)$, wherein $L_1(\lambda_i, T_0)$ is radiation brightness of radiation light emitted from the measured surface 9 under a wavelength $\lambda_i$ and received by the optical receiver 5, and is a function of the first voltage signal and a spectrum response function of the optical receiver 5; $\varepsilon(\lambda_i)$ is emissivity of the measured surface 9 under a wavelength $\lambda_i$; $L_0(\lambda_i, T_0)$ is radiation brightness of a blackbody under the same condition with the measured surface 9; i=1~n, where i, n is a positive integer greater than or equal to 1; $\lambda_i$ is an effective wavelength, with a unit of meter; $T_0$ is a temperature of the measured surface 9, with a unit of K;

obtaining n expressions of radiation brightness at the second measurement position under n wavelengths or under n wavebands according to the following formula: $L_2(\lambda_i, T_0) = f(\varepsilon_i) L_0(\lambda_i, T_0)$, wherein $L_2(\lambda_i, T_0)$ is a radiation brightness of radiation light emitted from the measured surface 9 under a wavelength $\lambda_i$ and received by the optical receiver 5, and is a function of the second voltage signal and a spectrum response function of the optical receiver 5; $f(\varepsilon_i)$ is a function of effective emissivity of the reflector 1-1 under a wavelength $\lambda_i$;

simultaneously calculating the temperature $T_0$ and n emissivities $\varepsilon_i$ under n wavelengths according to n expressions of radiation brightness at the first measurement position $L_1(\lambda_i, T_0) = \varepsilon(\lambda_i) L_0(\lambda_i, T_0)$ and n expressions of radiation brightness at the second measurement position $L_2(\lambda_i, T_0) = f(\varepsilon_i) L_0(\lambda_i, T_0)$.

Wherein, the reflection surface 10 of the reflector 1-1 is preferably a spherical cap. More preferably, the reflection surface is a hemispherical surface.

The bottom circle of the hemispherical surface is located on the bottom surface of the reflector 1-1. When the temperature and the emissivity of the measured surface 9 are measured, the reflector 1-1 may be directly placed on the measured surface 9 to ensure the relative positions of the measured surface 9 and the reflector 1-1, such that the spherical center of the reflector 1-1 falls on the measured surface 9, so as to improve the accuracy of the measurement result.

Certainly, the reflection surface 10 may also be a hyperboloid, a cylindrical surface, a paraboloid, a wedge surface or a conical surface, or other types of reflection surfaces.

In one preferred embodiment, the reflection surface 10 is a spherical cap, for example a hemispherical surface. The absorber tube 1-2 is a straight tube. At the first measurement position and the second measurement position, the axis of the absorber tube 1-2 passes through the spherical center 11 of the spherical cap. The position may improve the accuracy of the measurement result.

In the case that the reflection surface 10 is a spherical cap. An angle of θ is defined between the axis of the absorber tube 1-2 and a line perpendicular to a bottom surface of the reflector 1-1 and is in the range of 0°~80°. For example, the angle θ may be 0°, 5°, 10°, 20°, 30°, 45°, 55°, 60°, 70°, 80°, etc.

The ratio of the diameter of the through hole 7 to the diameter of the reflection surface 10 of the spherical cap is as small as possible, as long as lights may be smoothly output from the through hole 7 and the absorber tube 1-2 may smoothly pass through the through hole 7 when needed. For example, the ratio may be 1/10 ~1/2. Certainly, it may also be less than 1/10.

In order to effectuate shifting the absorber tube 1-2 between the first measurement position and the second measurement position, preferably, the absorber tube 1-2 is arranged to reciprocally move along own axis. Alternatively, the absorber tube may be a telescopic tube, wherein the light incident end of the absorber tube 1-2 is provided at an end of a telescopic portion of the telescopic tube. The structures of the absorber tube in the aforementioned configurations are relatively simple, and the control of the movement process is relatively convenient and accurate.

For example, when the absorber tube is a telescopic tube which may effectuate shifting between the first measurement position and the second measurement position by means of telescoping, the absorber tube itself may be divided into such two sections of tubes as a first tube body and a second tube body, in which the first tube body may be fixedly arranged with respect to the reflector, the second tube body is telescopically arranged with respect to the first tube body, and the light incident end is provided at the end of the second tube body away from the first tube body. In the first measurement position, the second tube body extends out of the first tube until the light incident end approaches or contacts the measured surface. In the second measurement position, the second tube is retracted into the first tube and the light incident end is located at or outside the through hole.

Preferably, the inner surface of the absorber tube 1-2 is a rough surface and has a highly absorptive coating. For example, the inner surface of the absorber tube 1-2 may be internally threaded to form a rough surface, followed by an oxidation treatment. The configuration may increase the absorptivity of the inner wall of the absorber tube 1-2 so as to absorb the radiation light directed to the inner surface, and only transmit the light directly transmitted from the central hole of the absorber tube 1-2, so that the light absorber 5 only receives the inherent radiation light from the measured surface 9, and at this time, the reflection effect of the reflector 1-1 is disenabled.

Preferably, the reflection converter 1 further comprises a light guide structure 4 located between the absorber tube 1-2 and the optical receiver 5. The light guide structure 4 serves to transmit the radiation light passing through the central hole of the absorber tube 1-2 to the optical receiver 5. Preferably, the light guide structure 4 comprises a lens assembly and/or an optical fiber.

The optical receiver 5 comprises a photoelectric conversion unit, which is used for converting radiation light into an electric signal. For example, the photoelectric conversion unit comprises one or more photodiodes, or the photoelectric conversion unit comprises a thermopile.

Wherein, the semiconductor material of the photodiode comprises, but is not limited to, Si, InGaAs, Ge and the like, and the photodiode receives a wavelength range of 0.25 μm to 14 μm.

Preferably, the optical receiver 5 further comprises a spectrometer 2 which is respectively coupled to the absorber tube 1-2 and the photoelectric conversion unit.

The wavelength range received by the spectrometer 2 may reach 0.2 μm~1000 μm. The spectrometer 2 may be, for example, a prism spectrometer, a grating spectrometer or a Fourier spectrometer. When the light guide structure 4 is disposed between the absorber tube 1-2 and the optical receiver 5, the spectrometer 2 is located between the light guide structure 4 and the photoelectric conversion unit, for example, disposed between the lens assembly and the photodiode. The spectrometer 2 is configured to receive the radiation light transmitted by the absorber tube 1-2 or the light guide structure 4, divide the radiation light into monochromatic light, and transmit the monochromatic light to the photoelectric conversion unit, to finally make the data processor 6 to obtain an expression of brightness temperature and emissivity within different wavelengths or wavebands.

In order to control the absorber tube 1-2 to shift between the first measurement position and the second measurement position, the measurement device further comprises a driving device 3, which comprises a actuating device 8 drivingly connected with the absorber tube 1-2 to drive the absorber tube 1-2 to shift between the first measurement position and the second measurement position.

Wherein preferably, the data processor 6 is coupled with the actuating device 8 to control the action of the driving device 3. For example, the actuating device 8 may be an electromagnet or a motor or a pneumatic device or a hydraulic device. The data processor 6 may control the action of the absorber tube 1-2 by controlling energization or de-energization or the magnitude of current upon energization of the electromagnet, the motor, or a solenoid valve coupled with the pneumatic device or the hydraulic device, or the like.

In one preferred embodiment, the driving device 3 further comprises a hollow box, to which the actuating device 8 and the absorber tube 1-2 are connected. The measurement device comprises a light guide structure 4 located between the absorber tube 1-2 and the optical receiver 5, wherein the light guide structure 4 is disposed within the hollow box. The configuration may enable the movement of the absorber tube by the driving device 3 without affecting the operation of the light guide structure 4.

Certainly, the driving device 3 is not necessary, and the action of the absorber tube 1-2 may be directly or indirectly controlled by manpower.

The reflection surface 10 is a mirror surface. The mirror surface may be formed by plating a film with high reflectivity after mechanically polishing the inner surface of the reflector. Preferably, the film is a metal film. The material of the metal film may be gold, silver, aluminum or the like. More preferably, a further layer of protective film, such as a magnesium fluoride protective film, may also be formed on the metal film to prevent the reflective surface from being scratched.

The measurement device also comprises a measurement result output device, such as a displayer or a sound-producing apparatus. The measurement result output device is coupled with the data processor to output the measurement result formed by the data processor.

The present application provides a measurement method for accurately measuring the temperature and emissivity of the measured surface 9, which comprises measuring the emissivity and temperature of the measured surface 9 using any of the above measurement devices.

The measurement method preferably comprises the following steps:

a step of obtaining expressions of radiation brightness at the first measurement position: positioning the absorber tube 1-2 at a first measurement position, and obtaining n expressions of radiation brightness at the first measurement position under n wavelengths or under n wavebands according to the following formula: $L_1(\lambda_i, T_0) = \varepsilon(\lambda_i) L_0(\lambda_i, T_0)$, wherein $L_1(\lambda_i, T_0)$ is radiation brightness of radiation light emitted from the measured surface 9 and received by the optical receiver 5 under a wavelength $\lambda_i$, is a function of the first voltage signal and a spectrum response function of the optical receiver 5; $\varepsilon(\lambda_i)$ is emissivity of the measured surface 9 under a wavelength $\lambda_i$; $L_1(\lambda_i, T_0)$ is radiation brightness of a blackbody under the same condition with the measured surface 9; i=1·n, where i, n is a positive integer greater than or equal to 1; $\lambda_i$ is an effective wavelength, with a unit of meter; $T_0$ is a temperature of the measured surface 9, with a unit of K;

a step of obtaining expressions of radiation brightness at the second measurement position, positioning the absorber tube 1-2 at the second measurement position, and obtaining n expressions of radiation brightness at the second measurement position under n wavelengths or under n wavebands according to the following formula: $L_2(\lambda_i, T_0) = f(\varepsilon_i) L_1(\lambda_i, T_0)$, wherein $L_2(\lambda_i, T_0)$ is radiation brightness of radiation light emitted from the measured surface 9 and received by the optical receiver 5 under a wavelength $\lambda_i$, is a function of the second voltage signal and a spectrum response function of the optical receiver 5; $f(\varepsilon_i)$ is a function of effective emissivity of the reflector 1-1 under a wavelength $\lambda_i$; $L_1(\lambda_i, T_0)$ is radiation brightness of a blackbody of the measured surface 9 under the same condition; i=1~n, where i, n is a positive integer greater than or equal to 1; $\lambda_i$ is an effective wavelength, with a unit of meter; $T_0$ is a surface temperature of the measured surface 9, with a unit of K:

a step of obtaining a measurement result: simultaneously calculating the temperature $T_0$ and n emissivities $\varepsilon_i$ according to n expressions of radiation brightness at the first measurement position $L_1(\lambda_i, T_0) = \varepsilon(\lambda_i) L_0(\lambda_i, T_0)$ and n expressions of radiation brightness at the second measurement position $L_2(\lambda_i, T_0) = f(\varepsilon_i) L_0(\lambda_i, T_0)$.

The present application does not limit the order of the step of obtaining the expressions of radiation brightness at the first measurement position and the step of obtaining expressions of radiation brightness at the second measurement position, i.e. the step of obtaining expressions of radiation brightness at the first measurement position may be before the step of obtaining expressions of radiation brightness at the second measurement position, and may also be after the step of obtaining expressions of radiation brightness at the second measurement position. When n is greater than 1, it may also be in a way such that the step of obtaining expressions of radiation brightness at the first measurement position and the step of obtaining expressions of radiation brightness at the second measurement position are alternately performed. In the performing process, the order or the amount of expressions obtained upon each performing is not limited.

For example, when n is 2, the data processor 6 may obtain expressions of radiation brightness at the first measurement position under two wavelengths or two wavebands, before obtaining expressions of radiation brightness at the second measurement position under two wavelengths or two wavebands. The data processor 6 may also obtain expressions of radiation brightness at the second measurement position under two wavelengths or two wavebands, before obtaining expressions of the radiation brightness at the first measurement position under two wavelengths or two wavebands. The data processor 6 may also obtain an expression of radiation brightness at the first measurement position under a first wavelength or a first waveband, before obtaining an expression of radiation brightness at the second measurement position under a first wavelength or a first waveband, and then the data processor 6 may obtain an expression of radiation brightness at the second measurement position under a second wavelength or a second waveband, before obtaining an expression of radiation brightness at the first measurement position under a second wavelength or a second waveband. In summary, the order of obtaining expressions of radiation brightness is not limited in the present application as long as a required amount of expressions can be obtained.

Wherein, at the step of obtaining expressions of radiation brightness at the second measurement position, the function of effective emissivity may be formed by derivation or simulation according to the physical parameters of the measurement device. The physical parameters comprise the spectral reflectivity of the reflection surface 10, the geometric parameters of the reflection surface 10, the measurement distance between the reflection surface 10 and the measured surface 9, the position parameters of the absorber tube 1-2 and the reflector 2, and the emission and reflection properties of the measured surface 9. In the case where the structure of the reflection surface 10 is simple and easily described by a mathematical expression, for example, in the case where the reflection surface 10 is a hemispherical surface, a function of an effective emissivity may be derived by way of derivation. Moreover, in the case where the shape of the reflector 1-1 and the reflection surface 10 is complicated, for example in the case where the reflection surface is a hyperboloid or a cylindrical surface, a presentation may be made in such a form as to form an empirical formula or a graph.

In one preferred embodiment, the reflection surface 10 of the reflector 1-1 is a spherical cap, and the measurement method further comprises: positioning and retaining the spherical center of the reflection surface 10 on the measured surface 9. The configuration facilitates obtaining an accurate measurement result.

At this time, one example that may be described using a formula is as follows: when the measured surface 9 is a diffuse emission or diffuse reflection surface, the reflection surface 10 of the reflector 1-1 is a hemispherical surface, and the axis of the absorber tube 1-2 and the measured surface 9 define an angle of 90° the function of effective emissivity is:

$$f(\varepsilon_i) = \frac{\varepsilon_i}{1 - \rho_i(1 - \varepsilon_i)\left(1 - \frac{r^2}{R^2}\right)}$$

wherein, $\rho_i$ is the spectral reflectivity of the reflector 1-1; r is the radius of the through hole with a unit of meter; and R is the radius of the reflector with a unit of meter.

The above measurement method has the advantages corresponding to the respective measurement device.

Various embodiments of the present application will be further described below in more detail in combination with FIGS. 1 to 6.

First Embodiment

Figure 2:
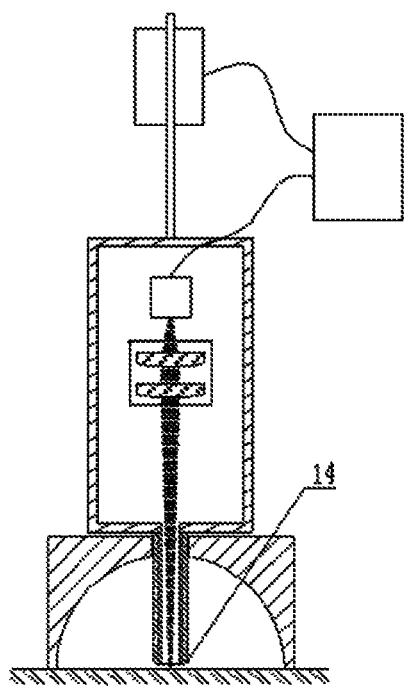
FIG. 2 is a schematic view of the structure of the measurement device as shown in FIG. 1 when the absorber tube is shifted to the first measurement position.
Figure 3:
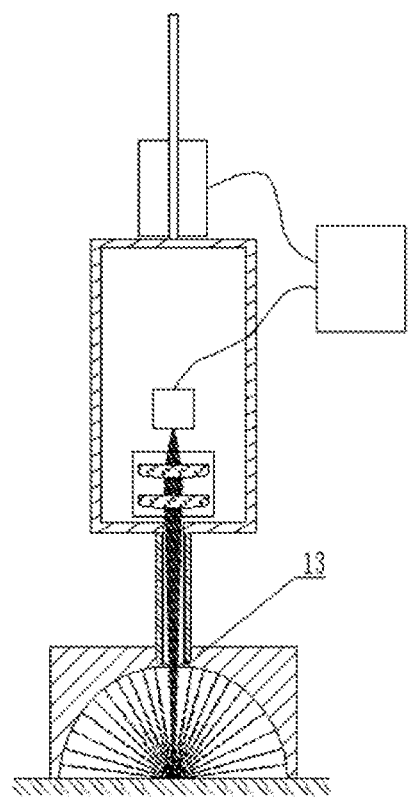
FIG. 3 is a schematic view of the structure of the measurement device as shown in FIG. 1 when the absorber tube is shifted to the second measurement position.

FIGS. 1 to 3 show the structure and operational principles of the measurement device according to the first embodiment of the present application.

As shown in FIGS. 1 to 3, the measurement device of the first embodiment comprises a reflection converter 1, a driving device 3, an optical receiver 5, a data processor 6, and a displayer as a measurement result output device.

The reflection converter 1 comprises a reflector 1-1, an absorber tube 1-2, and a light guide structure 4. In the present embodiment, the light guide structure 4 is a lens assembly.

The reflector has a through hole 7, and the reflection surface 10 of the reflector 1-1 is a hemispherical surface. Wherein, the reflection surface 10 of the reflector 1-1 is a hemispherical surface. The bottom surface of the reflector 1-1 is planar, and the bottom circle of the hemispherical surface is located on the bottom surface.

In the present embodiment, the ratio of the diameter of the through hole 7 of the reflector 1-1 to the diameter of the reflection surface 10 is 0.16.

In order to smoothly move the absorber tube 1-2 within the through hole 7, the outer diameter of the absorber tube 1-2 is smaller than the diameter of the through hole 7. In order to allow the light incident end of the absorber tube 1-2 to reach the corresponding measurement position, the length of the absorber tube 1-2 is greater than the radius of the hemispherical surface of the reflector 1-1.

In the first embodiment, the absorber tube 1-2 is variably arranged with respect to a position of the reflector 1-1 in order to shift the absorber tube 1-2 between a first measurement position and a second measurement position. As shown in FIG. 2, in the first measurement position, a light incident end of the absorber tube 1-2 is positioned at a low position 14 in the reflector 1-1 by inserting the absorber tube 1-2 into the through hole 7, and the light incident end approaches or contacts the measured surface 9, such that the optical receiver 5 receives inherent radiation light emitted from the measured surface 9. As shown in FIG. 3, in the second measurement position, the light incident end of the absorber tube 1-2 is located at a high position 13, and located at the through hole 7 or outside the through hole 7 of the reflector 1-1, such that the optical receiver 5 receives the inherent radiation light emitted from the measured surface 9 and reflective radiation light between a reflection surface 10 of the reflector 1-1 and the measured surface 9.

The optical receiver 5 is coupled with the reflection converter 1. The optical receiver 5 receives the radiation light of the reflection converter 1 and converts the radiation light into an electrical signal. In the present embodiment, the optical receiver 5 realizes the coupling with the reflection converter 1 by coupling with the lens assembly.

The data processor 6 is coupled with the optical receiver 5 to receive electrical signals and form the temperature and emissivity of the measured surface 9 according to the electrical signals.

The displayer is coupled to the data processor 6 to display the temperature and emissivity formed by the data processor.

The absorber tube 1-2 is a straight tube. At the first measurement position and the second measurement position, the axis of the absorber tube 1-2 passes through the spherical center 11 of the spherical cap. During the measurement, the reflector 1-1 is in contact with the measured surface 9, ensuring that the spherical center 11 of the reflection surface 10 is on the measured surface 9 and remains stationary.

In the present embodiment, the axis of the absorber tube 1-2 and a diameter perpendicular to a bottom surface of the reflector 1-1 define an angle of 0°. During the measurement, the axis of the absorber tube 1-2 and the measured surface 9 define an angle of 90°.

In the present embodiment, the inner surface of the absorber tube 1-2 may be internally threaded to form a rough surface, and a coating having a high absorptivity is formed on the rough surface as an absorption layer.

The light guide structure 4 is located between the absorber tube 1-2 and the optical receiver 5. In the present embodiment, the light guide structure 4 comprises a lens assembly. When the light guide structure 4 comprises a lens assembly, the absorber tube 1-2 needs to be aligned with the light spot at the spherical center of the hemispherical surface on the measured surface 9 when measurement is performed.

The optical receiver 5 comprises a photoelectric conversion unit, which is used for converting radiation light into an electric signal. In the present embodiment, the photoelectric conversion unit comprises a photodiode.

In the present embodiment, specifically, the photoelectric conversion unit comprises two photodiodes with an overlapping structure. The photoelectric conversion unit may simultaneously receive light energy of two wavebands. Thus, the measurement device of the present embodiment may respectively obtain two expressions of radiation brightness at the first measurement position and the second measurement position. Thereby, the data processor 6 may calculate the temperature and the emissivity comprising two wavebands or wavelengths using the obtained four expressions.

In order to effectuate shifting the absorber tube 1-2 between the first measurement position and the second measurement position, the absorber tube 1-2 is arranged to reciprocally move along own axis. The structure of the absorber tube 1-2 is relatively simple, and the control of the movement process is relatively convenient and accurate.

For better measurement and accurately and timely controlling the absorber tube 1-2 to shift between the first measurement position and the second measurement position, the driving device 3 is drivingly connected with the absorber tube 1-2, and the data processor 6 is also coupled with the driving device 3 to control the action of the driving device 3, so as to realize the automatic control of the absorber tube 1-2 to shift between the first measurement position and the second measurement position.

As shown in FIGS. 1 to 3, the driving device 3 comprises a actuating device 8 drivingly connected with the absorber tube 1-2 to drive the absorber tube 1-2 to shift between the first measurement position and the second measurement position. In the present embodiment, the actuating device 8 is an electromagnet. The data processor 6 is coupled with the electromagnet to control the action of the absorber tube 1-2 by controlling the energization or de-energization of the electromagnet. The driving device 3 is driven by an electromagnet. When the electromagnet is powered off, the spring on the electromagnet pushes the absorber tube 1-2 to the first measurement position (low position) and holds. When the electromagnet is powered on, it drives the absorber tube 1-2 to the second measurement position (high position).

As shown in FIGS. 1 to 3, in one preferred embodiment, the driving device 3 further comprises a hollow box, to which the actuating device 8 and the absorber tube 1-2 are connected. The light guide structure 4 is disposed within the hollow box.

In the present embodiment, the reflector 1-1 is made of stainless steel. The reflection surface 10 is mechanically polished and then plated with a layer of gold to form a mirror surface. Afterwards, a layer of protective film of magnesium fluoride is formed on the gold plated surface to prevent scratching of the reflection surface 10.

In the present embodiment, the absorber tube 1-2 and the driving device 3 are reciprocally movable with respect to the reflector 1-1, the optical receiver 5 and the data processor 6. The movement direction of the absorber tube 1-2 is the axial direction of the absorber tube 1-2. The axis of the absorber tube 1-2 passes through the spherical center 11. The upper end of the absorber tube 1-2 is connected with the driving device 3, and the lower end as the light incident end may pass through the through hole 7 and the reflection surface 10 into the interior of the reflector 1-1. In the first measurement position, the absorber tube 1-2 moves towards the direction of the spherical center 11 until the lower end approaches or contacts the measured surface 9, and the light incident end of the absorber tube 1-2 is in the low position 14 as shown in FIG. 2. In the second measurement position, the absorber tube 1-2 is drawn and the light incident end which is located outside the reflection surface 10 of the reflector 1-1, that is, in the high position 13 as shown in FIG. 3.

The lens assembly as the light guide structure 4 has one end facing the spherical center 11 of the hemispherical surface and the other end facing the photodiode serving as the optical receiver 5. The light guide structure 4 forms a part of the receiving light path. The radiation light emitted from the light spot of the measured surface 9 enters the lens assembly via the interior of the absorber tube 1-2, and the lens assembly converges the radiation light on the receiving surface of the photodiode.

In the present embodiment, the receiving light path formed by the lens assembly 4 satisfies two conditions: a. the position of the light spot is exactly at the spherical center; b. the diameter of the light spot is smaller than the inner diameter of the absorber tube 1-2, and in the first measurement position and the second measurement position, the absorber tube 1-2 does not block the receiving light path. For example, in the present embodiment, the ratio of the diameter of the light spot to the diameter of the hemispherical surface is 0.02.

Second Embodiment

The second embodiment is a measurement method for measuring the temperature and the emissivity of the measured surface 9 using the measurement device of the first embodiment.

In the present embodiment, the specific measurement steps of the measurement method are as follows:

The step of obtaining expressions of radiation brightness at the first measurement position: the reflector 1-1 of the measurement device is positioned on the measured surface 9; the driving mechanism 3 drives the absorber tube 1-2 to move to the first measurement position and hold. The reflector 1-1 of the measurement device is placed on the measured surface 9 to allow that the reflector 1-1 and the measured surface 9 are in contact and maintained, thus, at this time, the reflection action of the reflector 1-1 is disenabled, and part of the radiation energy emitted from the spherical center 11 is absorbed by the inner surface of the absorber tube 1-2, and the other part is projected onto the photodiode through the lens assembly along the axial direction of the absorber tube 1-2. The data processor 6 obtains expressions of radiation brightness at the first measurement position under two wavebands:

$$L_1(\lambda_i, T) = \varepsilon(\lambda_i) L_0(\lambda_i, T_0)$$

wherein i=1, 2; $L_1(\lambda_i, T_0)$ is radiation brightness of radiation light emitted from the measured surface 9 under a wavelength $\lambda_i$ and received by the optical receiver 5 under a wavelength $\lambda_i$; $\varepsilon(\lambda_i)$ is emissivity of the measured surface 9 under a wavelength $\lambda_i$; $L_1(\lambda_i, T_0)$ is radiation brightness of a blackbody under the same condition with the measured surface 9; $\lambda_i$ is an effective wavelength, with a unit of meter; $T_0$ is a temperature of the measured surface 9, with a unit of K.

In the step of obtaining expressions of radiation brightness at the first measurement position, the expression $L_1(\lambda_i, T) = \varepsilon(\lambda_i) L_0(\lambda_i, T_0)$ of radiation brightness at the first measurement position may use different specific forms of presentation. For example, in the present embodiment, the following formula is used:

$$\frac{1}{T_{bi}} = \frac{1}{T_0} - \frac{\lambda_i}{c_2} ln\varepsilon_i,$$

wherein i=1~n, i and n are positive integers greater than or equal to 1; $\lambda_i$ is an effective wavelength with a unit of meter; $T_{bi}$ is brightness temperature of the absorber tube 1-2 located at the first measurement position and under a wavelength $\lambda_i$ with a unit of K; $T_0$ is temperature of the measured surface 9, with a unit of K; $\varepsilon_i$ is emissivity under the conditions of a wavelength $\lambda_i$ and a temperature $T_0$.

In the step of obtaining expressions of radiation brightness at the second measurement position, the reflector 1-1 of the measurement device is maintained to be positioned on the measured surface 9, and the absorber tube 1-2 is driven by the driving device 3 to move to the second measurement position and hold. At this time, the reflector 1-1 has a reflection effect over the spherical center 11. Part of the radiation light emitted from the spherical center 11 is directly received by the optical receiver 5 and the other part is received by the optical receiver 5 in multiple reflection processes of the reflector 1-1 and the spherical center 11. In this case, the data processor 6 obtains expressions of radiation brightness at the second measurement position under two wavebands:

$$L_2(\lambda_i, T_0) = f(\varepsilon_i) L_0(\lambda_i, T_0)$$

wherein i=1, 2; $L_2(\lambda_i, T_0)$ is radiation brightness of radiation light emitted from the measured surface 9 under a wavelength $\lambda_i$ and received by the optical receiver 5 under a wavelength $\lambda_i$; $f(\varepsilon_i)$ is a function of effective emissivity of the reflector 1-1 under a wavelength $\lambda_i$; $L_0(\lambda_i, T_0)$ is radiation brightness of a blackbody under the same condition with the measured surface 9; $\lambda_i$ is an effective wavelength, with a unit of meter; $T_0$ is a temperature of the measured surface 9, with a unit of K.

In the step of obtaining expressions of radiation brightness at the second measurement position, the expression $L_2(\lambda_i, T_0) = f(\varepsilon_i) L_0(\lambda_i, T_0)$ of radiation brightness at the first measurement position may use different specific forms of presentation. For example, in the present embodiment, the following formula is used:

$$\frac{1}{T_{ai}} = \frac{1}{T_0} - \frac{\lambda_i}{c_2} ln f(\varepsilon_i),$$

wherein $T_{ai}$ is a brightness temperature of the absorber tube 1-2 located at the second measurement position and under a wavelength $\lambda_i$ with a unit of K; $f(\varepsilon_i)$ is a function of effective emissivity of the reflector 1-1.

Figure 4:
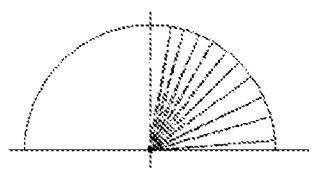
FIG. 4 is a schematic view of the reflective radiation light of the reflector in the measurement device as shown in FIG. 1.

As shown in FIG. 4, in the present embodiment, the reflection surface 10 is set as a hemispherical surface, and the position relation of the reflection surface and the measured surface during the measurement is such that the spherical center of the hemispherical surface is located on the measured surface 9. In FIG. 4, because the radiation lights is symmetrical, only the radiation lights on the right side of the normal direction are drawn. In this case, the light spot has the following characteristics:

1) The radiation light at the light spot has a simple route. All the radiation light emitted from the light spot are reflected back to the origin only after one reflection by the hemispherical surface, and then reflected back to the origin after reflection by the measured surface 9 and the hemispherical surface, and so on. At the same time, the radiation light emitted from other points than the light spot at the measured surface 9 does not fall at the light spot;

2) 'Isolated' radiation points are at the light spot. Since there is no exchange of heat radiation between the light spot and the non-light-spot, the measurement range only consists in the temperature and emissivity at the light spot, irrespective of the state at the non-light-spot. When the emissivity and temperature distribution of the measured surface 9 are not uniform, even if the area of the measured surface 9 is smaller than the coverage area of the hemispherical mirror, the measurement result will not be affected.

According to above two aspects the expression $f(\varepsilon)$ may be accurately calculated, only related with the inherent emissivity of the light spot, and the reflectivity of the reflector.

Since the spherical center of the hemispherical reflection is on the measured surface 9, the reflection radiation light of the light spot 11 and the reflector 1-1 has a simple route, where the expression $f(\varepsilon_i)$ may accurately obtain:

$$f(\varepsilon_i) = \frac{\varepsilon_i}{1 - \rho_i(1 - \varepsilon_i)\left(1 - \frac{r^2}{R^2}\right)},$$

where, $\rho_i$ is a spectral reflectivity of the reflector 1-1, r and R are respectively the radius of the through hole 7 and the radius of the reflector 1-1.

In the step of obtaining a measurement result, the measurement device is moved away from the measured surface 9. According to the four equations $L_1(\lambda_i, T_0)=\varepsilon(\lambda_i)L_0(\lambda_i, T_0)$ and $L_2(\lambda_i, T_0)=f(\varepsilon_i)L_0(\lambda_i, T_0)$ obtained by the step of obtaining expressions of radiation brightness at the first measurement position and the step of obtaining expressions of radiation brightness at the second measurement position (specifically $$\frac{1}{T_{bi}} = \frac{1}{T_0} - \frac{\lambda_i}{c_2}\ln\varepsilon_i \text{ and } \frac{1}{T_{ai}} = \frac{1}{T_0} - \frac{\lambda_i}{c_2}\ln f(\varepsilon_i)$$

in the present embodiment, where $T_{bi}$ and $T_{ai}$ are respectively the brightness temperatures at the first and second measurement positions, with a unit of K), two emissivities $\varepsilon_i$ and real temperature $T_0$ of the measured surface are simultaneously calculated by the data processor 6, and the measurement result is displayed on the displayer.

In the 4 equations, $T_{bi}$, $T_{ai}$, $\lambda_i$ may be directly measured by the measurement device, wherein $C_2$ is a constant, and the spectral reflectivity $\rho_i$ of the reflector 1-1 is a physical attribute of the reflector 1-1, irrespective of the state of the measured surface. It can be known from the prior art that, if the reflection surface 10 is gold-plated, $\rho_i$ at the infrared spectrum i>1 um are almost equal. Thus it can be assumed that $\rho_i=\rho$ is an unknown irrespective of a wavelength, so that there are four equations and four unknowns, comprising two emissivities, $\varepsilon_1$, $\varepsilon_2$, reflectivity, $\rho$ and temperature $T_0$. The emissivity and temperature may be obtained by solving a system of nonlinear equations.

For other unspecified parts in the second embodiment, reference may be made to the related content in other respective embodiments.

Third Embodiment

Figure 5:
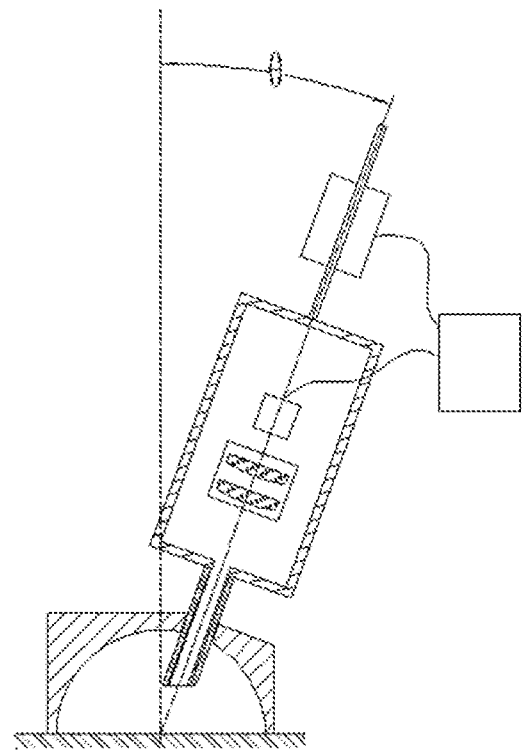
FIG. 5 is a schematic view of the structure of the measurement device according to the third embodiment of the present application.

As shown in FIG. 5, the difference between the present embodiment and the first embodiment lies in that the axis of the absorber tube 1-2 forms an angle θ with the diameter perpendicular to the bottom surface of the reflector 1-1, so that during the measurement, after the bottom surface is placed on the measured surface 9, the axis of the absorber tube 1-2 forms an angle θ with the normal of the measured surface 9. The present embodiment may measure the emissivity in the direction of the angle θ. In the present embodiment, the angle θ is 30°.

For other unspecified parts in the third embodiment, reference may be made to the related content in other respective embodiments.

Fourth Embodiment

Figure 6:
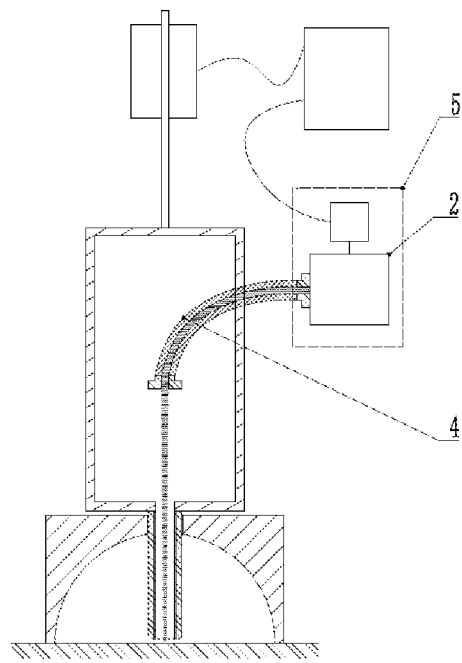
FIG. 6 is a schematic view of the structure of the measurement device according to the fifth embodiment of the present application.

As shown in FIG. 6, the difference between the fourth embodiment and the first embodiment lies in that the light guide structure 4 in the reflection converter 1 of the measurement device is an optical fiber. In addition, the optical receiver 5 further comprises a spectrometer 2. The spectrometer 2 is specifically a Fourier spectrometer. The radiation light entering the reflection converter 1 via the absorber tube 1-2 is guided into the spectrometer 2 through the optical fiber 4, and then decomposed into monochromatic light by the spectrometer 2, and then projected into the photodiode.

For other unspecified parts in the fourth embodiment, reference may be made to the related content in other respective embodiments.

Fifth Embodiment

The fifth embodiment is a measurement method for measuring the temperature and the emissivity of the measured surface 9 using the measurement device of a modified example of the first embodiment. In the modified example, the photoelectric conversion unit comprises a photodiode that receives the radiation light of one waveband. Different from the second embodiment, the data processor 6 obtains only an expression of radiation brightness under the one waveband. The expressions at the first measurement position and the second measurement position are respectively: $L_2(\lambda_i, T_0)=\varepsilon_a(\lambda_1)L_0(\lambda_i, T_0)$ and $L_2(\lambda_i, T_0)=f(\varepsilon_1)L_0(\lambda_i, T_0)$. At this time, $$f(\varepsilon_i) = \frac{\varepsilon_1}{1 - \rho_i(1 - \varepsilon_i)\left(1 - \frac{r^2}{R^2}\right)},$$

and the reflectivity $\rho_1$ is given by experience. In this case, there are only two unknowns $\varepsilon_1$ and $T_0$, which may be solved simultaneously by using two equations.

For other unspecified parts in the fifth embodiment, reference may be made to the related content in other respective embodiments.

Sixth Embodiment

The sixth embodiment is a measurement method for measuring the temperature and emissivity of the measured surface 9 using a measurement device, in which the reflection surface of the reflector is a non-hemispherical surface (the reflection surface is a non-spherical surface, or the reflection surface is a spherical surface but the spherical center is not on the measured surface).

Since the reflection surface of the reflector is a non-spherical surface, or the reflection surface is a spherical surface but the spherical center is not on the measured surface, the expression of a function $f(\varepsilon_i)$ of effective emissivity differs from the second embodiment. The expression of its function $f(\varepsilon_i)$ of effective emissivity may be obtained by empirical formula or simulation calculation:

$$f(\varepsilon_i) = f(\varepsilon_i, \rho_i, \theta, h, \Omega, \eta)$$

The related parameters are as follows: according to the measurement device, the physical parameters comprise the spectral reflectivity $\rho_i$ of the reflection surface 10, the geometric parameters $\Omega$ of the reflection surface 10, the measurement distance h between the reflection surface 10 and the measured surface 9, the angle $\theta$ of the axis of the absorber tube 1-2 and the measured surface 9, and the emission and reflection property parameters $\eta$ of the measured surface 9.

For other unspecified parts in the sixth embodiment, reference may be made to the related content in other respective embodiments.

The measurement device or the measurement method for measuring the temperature and the emissivity of the measured surface 9 in the above embodiments of the present application has the advantages of portability, less space needed for measurement without an interference by the background radiation, convenient use, and high precision in measurement. The application may be used for on-line measurement of the temperature and emissivity of a measured surface, and used for setting the emissivity parameters of a general radiation thermometer. It may also be used as a metering standard of emissivity and temperature, and may also be applied in a metering test department.

The present application is not limited to the above embodiments. For example, if the temperature and the emissivity of a measured surface in movement are measured, a spherical cap or a hyperboloid which is non-hemispherical may be used as a reflection surface of the reflector. At this time, the reflection surface of the reflector should be kept certain distance from the measured surface, so that the relative movement of the measured surface with respect to the reflector of the measurement device is maintained smooth. When the reflection surface is a spherical cap, the spherical center of the spherical cap is advantageously maintained on the measured surface in the measurement process. When the reflection surface is a hyperboloid, the distance between the reflector and the measured surface is advantageously within the effective measurement range in the measurement process.

When a measured surface in movement is measured using the measurement device of the present application, although the measurement points of the measured surface which are aligned when the absorber tube is in the first measurement position and the second measurement position are changed, for a continuous measured surface, the temperature and emissivity within certain area may not change drastically. Thus, although the temperature and emissivity measured at this time are not obtained from the same measurement point of the measured surface, they are still measured result which may still be representative of the temperature and emissivity of the measured surface within a range of certain area, so that it is also of practical significance.

Finally, it should be explained that: the aforementioned embodiments are only used to describe the technical solution of the present application rather than limiting the same; although detailed explanations are made to the present application by referring to preferred embodiments, a common technical person in the art should understand that: it is still possible to make amendments to the embodiments of the present application or make equivalent replacements to part of the technical features; without departing from scope of the present application, they should all be covered in the scope of the technical solution for which protection is sought in the present application.

The invention claimed is:

1. A measurement device for measuring a temperature and an emissivity of a measured surface, comprising:
a reflection converter, an optical receiver, a data processor, and a driving device, wherein the optical receiver is coupled to the reflection converter and is configured to receive radiation light emitted from a measured surface and passing through the reflection converter and convert the radiation light into an electrical signal, and wherein the data processor is coupled to the optical receiver and is configured to receive the electrical signal and to determine a temperature and an emissivity of the measured surface according to the electrical signal;
wherein the reflection converter comprises a reflector having a through hole, and an absorber tube which is movably arranged with respect to the reflector in order to shift the absorber tube between a first measurement position and a second measurement position;
wherein in the first measurement position, a light incident end of the absorber tube is positioned in the reflector by inserting the absorber tube into the through hole, and the light incident end of the absorber tube approaches or contacts the measured surface, such that the optical receiver receives inherent radiation light emitted from the measured surface and forms a first electrical signal;
wherein in the second measurement position, the light incident end of the absorber tube is positioned at the through hole or outside the through hole, such that the optical receiver receives the inherent radiation light emitted from the measured surface and reflective radiation light between a reflection surface of the reflector and the measured surface and forms a second electrical signal;
wherein the data processor is configured to determine a temperature and an emissivity of the measured surface according to the first electrical signal and the second electrical signal; and
wherein the driving device comprises an actuating device drivingly connected with the absorber tube to shift the absorber tube between the first measurement position and the second measurement position.

2. The measurement device according to claim 1, wherein the first electrical signal is a first voltage signal, the second electrical signal is a second voltage signal, and the data processor is configured to process the first voltage signal and the second voltage signal by:

obtaining n expressions of radiation brightness at the first measurement position under n wavelengths or under n wavebands according to the following formula: $L_1(\lambda_i, T_0)=\varepsilon(\lambda_i)L_0(\lambda_i, T_0)$, wherein $L_1(\lambda_i, T_0)$ is radiation brightness of radiation light emitted from the measured surface under a wavelength $\lambda_i$ and received by the optical receiver, and is a function of the first voltage signal and a spectrum response function of the optical receiver, wherein $\varepsilon(\lambda_i)$ is emissivity of the measured surface under a wavelength $\lambda_i$, wherein $L_1(\lambda_i, T_0)$ is radiation brightness of a blackbody under the same condition with the measured surface, wherein i=1~n, where i, n is a positive integer greater than or equal to 1, wherein $\lambda_i$ is an effective wavelength, with a unit of meter, and wherein $T_0$ is temperature of the measured surface, with a unit of K;

obtaining n expressions of radiation brightness at the second measurement position under n wavelengths or under n wavebands according to the following formula: $L_2(\lambda_i, T_0)=f(\varepsilon_i)L_0(\lambda_i, T_0)$, wherein $L_2(\lambda_i, T_0)$ is radiation brightness of radiation light emitted from the measured surface under a wavelength $\lambda_i$ and received by the optical receiver, and is a function of the second voltage signal and a spectrum response function of the optical receiver, and wherein $f(\varepsilon_i)$ is a function of effective emissivity of the reflector under a wavelength $\lambda_i$; and simultaneously calculating the temperature $T_0$ and n emissivities $\varepsilon_i$ under n wavelengths according to n expressions of radiation brightness at the first measurement position $L_1(\lambda_i, T_0)=\varepsilon(\lambda_i)L_0(\lambda_i, T_0)$ and n expressions of radiation brightness at the second measurement position $L_2(\lambda_i, T_0)=f(\varepsilon_i)L_0(\lambda_i, T_0)$.

3. The measurement device according to claim 1, wherein the reflection surface of the reflector comprises a spherical cap, a hyperboloid, a cylindrical surface, a paraboloid, a wedge surface or a conical surface.

4. The measurement device according to claim 3, wherein the reflection surface is a hemispherical surface.

5. The measurement device according to claim 1, wherein the reflection surface is a spherical cap, and the absorber tube is a straight tube and an axis of the absorber tube passes through a spherical center of the spherical cap at the first measurement position and the second measurement position.

6. The measurement device according to claim 5, wherein an angle of θ is defined between the axis of the absorber tube and a line perpendicular to a bottom surface of the reflector and is in the range of 0° ~80°.

7. The measurement device according to claim 1, wherein the absorber tube is arranged to reciprocally move along its own axis with respect to the reflector or the absorber tube is a telescopic tube, wherein the light incident end is located at an end of a telescopic portion of the telescopic tube.

8. The measurement device according to claim 1, wherein the reflection converter further comprises a light guide structure located between the absorber tube and the optical receiver.

9. The measurement device according to claim 1, wherein the optical receiver comprises a photoelectric conversion unit, which is coupled to the absorber tube for converting radiation light into an electric signal.

10. The measurement device according to claim 9, wherein the optical receiver further comprises a spectrometer, which is coupled to the absorber tube and the photoelectric conversion unit.

11. The measurement device according to claim 1, wherein the data processor is coupled with the actuating device to control an action of the driving device.

12. The measurement device according to claim 1, wherein the actuating device is an electromagnet, a motor, a pneumatic device or a hydraulic device.

13. The measurement device according to claim 1, wherein the driving device further comprises a hollow box, to which the actuating device and the absorber tube are connected, and the reflection converter further comprises a light guide structure located between the absorber tube and the optical receiver, wherein the light guide structure is disposed within the hollow box.

14. A measurement method for measuring a temperature and an emissivity of a measured surface, comprising measuring the temperature and the emissivity using the measurement device according to claim 1.

15. The measurement method according to claim 14, wherein the first electrical signal is a first voltage signal, and the second electrical signal is a second voltage signal, the measurement method comprising:

a step of obtaining expressions of radiation brightness at the first measurement position, comprising:
positioning the absorber tube at a first measurement position, and obtaining n expressions of radiation brightness at the first measurement position under n wavelengths or under n wavebands according to the following formula: $L_1(\lambda_i, T_0)=\varepsilon(\lambda_i)L_0(\lambda_i, T_0)$, wherein $L_1(\lambda_i, T_0)$ is radiation brightness of radiation light emitted from the measured surface under a wavelength $\lambda_i$ and received by the optical receiver, and is a function of the first voltage signal and a spectrum response function of the optical receiver, wherein $\varepsilon(\lambda_i)$ is emissivity of the measured surface under a wavelength $\lambda_i$, wherein $L_0(\lambda_i, T_0)$ is radiation brightness of a blackbody under the same condition with the measured surface, wherein i=1~n, where i, n is a positive integer greater than or equal to 1, wherein $\lambda_i$ is an effective wavelength, with a unit of meter, and wherein $T_0$ is a temperature of the measured surface, with a unit of K;

a step of obtaining expressions of radiation brightness at the second measurement position, comprising:
positioning the absorber tube at the second measurement position, and obtaining n expressions of radiation brightness at the second measurement position under n wavelengths or under n wavebands according to the following formula: $L_2(\lambda_i, T_0)=f(\varepsilon_i)L_0(\lambda_i, T_0)$, wherein $L_2(\lambda_i, T_0)$ is radiation brightness of radiation light emitted from the measured surface under a wavelength $\lambda_i$ and received by the optical receiver, and is a function of the second voltage signal and a spectrum response function of the optical receiver, and wherein $f(\varepsilon_i)$ is a function of effective emissivity of the reflector under a wavelength $\lambda_i$;

a step of obtaining a measurement result, comprising:
simultaneously calculating the temperature $T_0$ and n emissivities $\varepsilon_i$ under n wavelengths according to n expressions of radiation brightness at the first measurement position $L_1(\lambda_i, T_0)=\varepsilon(\lambda_i)L_0(\lambda_i, T_0)$ and n expressions of radiation brightness at the second measurement position $L_2(\lambda_i, T_0)=f(\varepsilon_i)L_1(\lambda_i, T_0)$.

16. The measurement method according to claim 15, wherein in the step of obtaining n expressions of radiation brightness at the second measurement position, the function of effective emissivity $f(\varepsilon_i)$ is established by deriving from or simulating according to physical parameters of the measurement device, and wherein the physical parameters comprise a spectral reflectance of the reflection surface, a distance of the reflection surface and the measured surface, geometric parameters of the reflection surface, position parameters of the absorber tube with respect to the reflector, and emission and reflection properties of the measured surface.

17. The measurement method according to claim 15, wherein the reflection surface is a hemispherical surface, and during the measurement the spherical center of the hemispherical surface is located on the measured surface;
wherein in the step of obtaining expressions of radiation brightness at the first measurement position, the expression $L_1(\lambda_i, T_0) = \varepsilon(\lambda_i)L_0(\lambda_i, T_0)$ of radiation brightness at the first measurement position is $$\frac{1}{T_{bi}} = \frac{1}{T_0} - \frac{\lambda_i}{c_2} ln\varepsilon_i,$$

wherein i=1~n, where i and n are positive integers greater than or equal to 1, wherein $\lambda_i$ is an effective wavelength with a unit of meter, wherein $T_{bi}$ is brightness temperature of the absorber tube located at the first measurement position and under a wavelength $\lambda_i$ with a unit of K, wherein $T_0$ is the temperature of the measured surface with a unit of K, and wherein $\varepsilon_i$ is emissivity under the conditions of a wavelength $\lambda_i$ and a temperature $T_0$;
wherein in the step of obtaining expressions of radiation brightness at the second measurement position, the expression $L_2(\lambda_i, T_0) = f(\varepsilon_i)L_0(\lambda_i, T_0)$ of radiation brightness at the second measurement position is $$\frac{1}{T_{ai}} = \frac{1}{T_0} - \frac{\lambda_i}{c_2} ln f(\varepsilon_i),$$

wherein $T_{ai}$ is brightness temperature of the absorber tube located at the second measurement position and under a wavelength $\lambda_i$ with a unit of K, and wherein $f(\varepsilon_i)$ is a function of effective emissivity of the reflector.

18. The measurement method according to claim 17, wherein $$f(\varepsilon_i) = \frac{\varepsilon_i}{1 - \rho_i(1-\varepsilon_i)\left(1-\frac{r^2}{R^2}\right)},$$

wherein $\rho_i$ is a spectral reflectivity of the reflector, and wherein r and R are respectively the radius of the through hole and the radius of the reflector.

19. The measurement method according to claim 14, wherein the reflection surface of the reflector is a spherical cap, and the measurement method further comprises:
positioning and retaining the spherical center of the reflection surface on the measured surface.

\* \* \* \* \*

UNITED STATES PATENT AND TRADEMARK OFFICE
CERTIFICATE OF CORRECTION

PATENT NO. : 11,047,739 B2  
APPLICATION NO. : 16/461212  
DATED : June 29, 2021  
INVENTOR(S) : Xie et al.

It is certified that error appears in the above-identified patent and that said Letters Patent is hereby corrected as shown below:

On the Title Page

In Column 2, Item (57), under "ABSTRACT", Line 1, delete "measurement" and insert -- A measurement --, therefor.

In the Claims

In Column 21, Claim 2, Line 12, delete "$L_1(\lambda_i, T_0)$" and insert -- $L_0(\lambda_i, T_0)$ --, therefor.

In Column 22, Claim 15, Line 61, delete "$L_2(\lambda_i, T_0)=f(\varepsilon_i)L_1(\lambda_i, T_0)$." and insert -- $L_2(\lambda_i, T_0)=f(\varepsilon_i)L_0(\lambda_i, T_0)$." --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*